Patented Feb. 26, 1946

2,395,550

UNITED STATES PATENT OFFICE 2,395,550

MODIFIED ALKYD RESINS

Ralph K. Iler, Cleveland Heights, Ohio, George H. Latham, Wilmington, Del., and John W. Robinson, Lakewood, Ohio, assignors to E. I. du Pont de Nemours & Company, Wilmington, Del., a corporation of Delaware No Drawing. Application September 30, 1942, Serial No. 460,228

9 Claims. (Cl. 260—22)

This invention relates to improved alkyd resins and more particularly to coating compositions containing such resins.

Alkyd resins at the present time are widely used in coating compositions and in general produce a tough, durable film having a satisfactory lustre. Alkyd resin coating compositions which are not modified with a drying or a semi-drying oil generally do not harden sufficiently even on prolonged baking at high temperatures. In some cases this deficiency has been overcome to a certain extent by the incorporation of urea-formaldehyde or melamine formaldehyde resins in such compositions. In order to produce sufficient hardness of the film, it is necessary to incorporate relatively high proportions of the urea-formaldehyde and melamine formaldehyde resins in the alkyd coating composition and this addition tends to render the finished enamel deficient in color stability on heating. Another disadvantage of straight alkyd resin coating compositions is the long time required for them to become tack-free when applied to a surface.

It is therefore an object of this invention to produce alkyd resin coating compositions which have a satisfactory color stability and which dry to a tack-free stage relatively quickly at low temperatures.

Another object is the provision of a method of producing coating compositions containing alkyd resins which set up to the tack-free stage quickly and result in a finish which has satisfactory hardness and durability.

A general object is the preparation of alkyd resins of improved properties.

Other objects will be apparent as the description of the invention proceeds.

These objects are accomplished by incorporating in an alkyd resin solution an organic solvent-soluble polysilicic acid ester. The resulting composition, to which pigments, plasticizers, etc., may be added, is applied to a surface and dried at a temperature between about 20° and 200° C.

Soluble alkyd resins contain reactive alcohol hydroxyl groups. In the treatment of an alkyd resin with a polysilicic acid ester by the process of this invention, an esterification or ester interchange reaction probably takes place to a greater or less extent between these alcohol hydroxyl groups and acid hydroxyl groups or ester groups in the polysilicic acid ester. In the resulting product carbon atoms in the alkyd resin molecules are joined to one another through the polysilicic acid ester residue. In this manner a so-called "crosslinked" structure is formed, which is considered to contribute in an important manner to the superior properties of these products. This structure may be illustrated by the following formula:

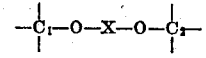

wherein $C_1$ and $C_2$ are carbon atoms originally bearing the hydroxyl groups in alkyd resin molecules, and X is the polysilicic acid ester residue.

The modifying agents of the resin coating composition are referred to herein generically as polysilicic acid esters, i. e., esters of polymeric silicic acids. Polysilicic acid esters containing unesterified silicic acid hydroxyl groups are referred to as acid polysilicic acid esters or alkyl acid polysilicates. This generic designation includes recently described products comprising esterified polysilicic acids substantially identical with such products prepared by the direct esterification of polysilicic acid, the latter compositions being more particularly described in U. S. patent application Ser. No. 439,549, filed April 18, 1942, by Joseph S. Kirk. Particularly desirable results may be obtained using the esterified polysilicic acids just described. The properties of the esterified polysilicic acids employed indicate that they have a nucleus of polysilicic acid with a predominance of ester groups present on the exterior of the nucleus. While this explanation of structure may account for the desirable properties of the compositions for use in modifying alkyd resins according to this invention, it will be understood that there may be other explanations also and that whatever may be the explanation, excellent results are obtained using such compositions.

In a preferred embodiment of the invention, a solution of a polysilicic acid ester in an organic solvent is added to and well mixed with a pigmented or unpigmented solution of the alkyd resin in an organic solvent. The proportions giving the best results will vary with the type of resin and the effect desired, as explained more fully hereinafter. Best results are usually obtained with an amount of polysilicic acid ester corresponding to 10–20% of $SiO_2$ based on the weight of alkyd resin. The polysilicic acid esters vary as to molecular weight, nature of esterifying alcohol, and ratio of silicic acid ester groups to silicon atoms. The polysilicic acid ester giving the best results will vary with the type of resin as is also explained more fully hereinafter. The solvents are so chosen that the polysilicic acid ester solution is miscible with the alkyd resin solution in the proportions used. Hydrocarbons, alcohols, or hydrocarbon-alcohol mixtures are the solvents used in most cases. The polysilicic acid ester-alkyd resin solution is applied to the surface to be coated, and the film is dried at ordinary or elevated temperatures, preferably at 100–150° C.

In one of the preferred embodiments of this invention, solutions of esterified polysilicic acids are used, prepared by contacting dissolved polysilicic acids with an esterifying agent such as a monohydric alcohol and removing water from the resulting solution. Such solutions and their preparation are described in U. S. patent application Ser. No. 439,549, filed April 18, 1942 by Joseph S. Kirk.

The more detailed practice of the invention is illustrated by the following examples, which show the use of esterified polysilicic acids as modifying agents in oil modified alkyd resin coating compositions. In Examples I, II and III a long non-drying oil modified alkyd resin is modified with a solution of methyl acid polysilicates in a mixed solvent containing methanol and the diethyl ether of diethylene glycol, a tributyl phosphate solution of butyl acid polysilicates, and a butanol solution of butyl acid polysilicates, respectively. By the term "butyl acid polysilicate" is meant a polysilicic acid butyl ester which contains some unesterified silicic acid hydroxyl groups. In Example IV a short non-drying oil modified alkyd resin is modified with a butanol solution of butyl acid polysilicates. In Examples V and VI a drying oil modified alkyd resin is modified with a tributyl phosphate solution of butyl acid polysilicates and a butanol solution of butyl acid polysilicates, respectively. In Example VII a mixed drying oil modified alkyd resin is modified with a butanol solution of butyl acid polysilicates.

*Example I*

A solution of a partially esterified polysilicic acid is prepared by dissolving in methanol a complex of silicic acid with the diethyl ether of diethylene glycol. Preparation of such a complex is described in U. S. Patent application Serial No. 439,547, filed April 18, 1942 by Joseph S. Kirk. The concentration of the polysilicic acid ester in the methanol solution on an $SiO_2$ basis is 12% by weight. A coating composition is prepared by mixing this solution with an aromatic hydrocarbon solvent-butanol solution of a castor oil (55%) modified glyceryl phthalate resin in such proportions that the composition contains 25% $SiO_2$ based on the alkyd resin weight. A film of this composition is baked for one hour at 105° C. and compared with a control film containing no silicic acid ester. It is clear and not objectionably tacky. The control film, on the other hand is very tacky.

*Example II*

A tributyl phosphate solution of polysilicic acids partially esterified with butanol is prepared as follows: Nine hundred grams (900 g.) of a 15.5% solution of sodium silicate ($SiO_2$:$Na_2O$=3.25:1 by weight)

is added to 860 g. of a vigorously stirred solution of 7% sulfuric acid over a period of 10 minutes. To the resulting solution 196 g. of tributyl phosphate and 460 g. of sodium chloride are added. Stirring is continued for one hour and then the mixture is allowed to stand for one hour. The upper, tributyl phosphate layer is separated, centrifuged, and dried over anhydrous sodium sulfate. The yield of clear, amber tributyl phosphate solution of partially esterified polysilicic acids is 125 g. It contains 16.5% $SiO_2$, 43.9% C, 9.02% H, 8.9% P and 3.4% free water.

The tributyl phosphate solution of butyl acid polysilicates is mixed with an aromatic hydrocarbon solvent-butanol solution of a castor oil (55%) modified glyceryl phthalate resin to obtain compositions containing 10, 20, 30 and 50% $SiO_2$ based on the alkyd resin weight. Films of these compositions are baked for one hour at 125° C. and compared with a control film containing no polysilicic acid ester. The control film is very tacky. The film containing 10% $SiO_2$ is only very slightly tacky but has a cheesy consistency. The films containing higher proportions of $SiO_2$ are tack-free, clear, glossy, and hard. Their hardness increases with increase in $SiO_2$ content; the film containing 50% $SiO_2$ is extremely hard.

*Example III*

A predominantly butanol solution of polysilicic acids partially esterified with butanol is prepared as follows from the tributyl phosphate solution described in Example II. One volume of the tributyl phosphate solution of partially esterified polysilicic acids is diluted with one volume of methanol, and 2.5 volumes of benzene is added rapidly with stirring. The methanol solution of partially esterified polysilicic acids which separates as a lower layer when the mixture is allowed to stand for 15 minutes contains 50–60% $SiO_2$. It is separated and dissolved in sufficient butanol to lower the $SiO_2$ concentration to 10.9% by weight.

The butanol solution of partially esterified polysilicic acids is mixed with an aromatic hydrocarbon solvent solution of a castor oil (55%) modified glyceryl phthalate resin to obtain compositions containing 30, 50 and 100% $SiO_2$ based on the alkyd resin weight. Films of these compositions are baked for one hour at 125° C. and compared with a control film containing no polysilicic acid ester. The control film is very tacky. The modified films, on the other hand, are tack-free, clear, glossy, and hard. Their hardness increases with increase in $SiO_2$ content. A film of the composition containing 100% $SiO_2$ becomes tack-free in three hours at room temperature while a control film containing no polysilicic acid ester remains tacky for more than three days.

*Example IV*

A butanol solution of butyl acid polysilicates prepared as described in Example III is mixed with a xylene solution of a castor oil (43%) modified glyceryl phthalate resin to obtain compositions containing 25, 50 and 100% $SiO_2$ based on the alkyd resin weight. Films of these compositions are baked for one hour at 125° C. and compared with a control film containing no polysilicic acid ester. The control film is tacky. The modified films, on the other hand, are tack-free, clear, glossy, and hard. Their hardness increases with increase in $SiO_2$ content.

*Example V*

A tributyl phosphate solution of butyl acid polysilicates prepared as described in Example II is mixed with a hydrocarbon solvent-butanol solution of linseed oil (52%) modified glyceryl phthalate resin to obtain compositions containing 10 and 23% $SiO_2$ based on the alkyd resin weight. Films of these compositions are baked for one hour at 125° C. and compared with a control film containing no polysilicic acid ester. The modified films are clear, glossy, and much harder than the control. The film containing 23% $SiO_2$ is harder than that containing only 10% $SiO_2$.

*Example VI*

A butanol solution of butyl acid polysilicates prepared as described in Example III is mixed with a hydrocarbon solvent-butanol solution of a linseed oil (52%) modified glyceryl phthalate resin in such proportions that the composition contains 10% $SiO_2$ based on the alkyd resin weight. A film of this composition baked for one hour at 125° C. is much harder than a control film containing no polysilicic acid ester.

Example VII

A butanol solution of butyl acid polysilicates prepared as described in Example III is mixed with a hydrocarbon solvent-butanol solution of a linseed oil (34.7%)-China-wood oil (13.9%) modified glyceryl phthalate resin to obtain compositions containing 5 and 10% $SiO_2$ based on the alkyd resin weight. Films of these compositions are baked for one hour at 125° C. and compared with a control film containing no polysilicic acid ester. They are clear, glossy, and much harder than the control. The film containing 10% $SiO_2$ is harder than that containing only 5% $SiO_2$.

The following examples illustrate other embodiments of the invention.

Example VIII

In this example an enamel based on a short non-drying oil modified alkyd resin is modified with a butanol solution of butyl acid polysilicates.

A mill base is prepared by grinding together the following materials:

| | Parts |
|---|---|
| Alkyd resin solution | 100 |
| Titanium oxide | 607 |
| Xylene | 293 |

An enamel is then prepared by mixing this mill base with additional materials in the following proportions:

| | Parts |
|---|---|
| Mill base | 165 |
| Alkyd resin solution | 147 |
| Butyl acid polysilicate solution | 45 |

The alkyd resin used in both the mill base and the enamel is a castor oil (43%) modified glyceryl phthalate resin prepared in the presence of 5.8% glycerol (based on total resin ingredients) in excess of the theoretical amount required to react with the phthalic anhydride present. It is used as a 50% solution in xylene. The butyl acid polysilicate solution is prepared by distilling butanol from a butanol solution of butyl acid polysilicates obtained as described in Example III until the $SiO_2$ concentration is 20%.

A film of this enamel baked for 1.5 hours at 127° C. is tack-free, hard, and glossy, whereas a control film containing no polysilicic acid ester remains tacky.

Example IX

In this example an enamel based on a short non-drying oil modified alkyd resin is modified with a solution of butyl acid polysilicates in a mixture of butanol and a hydrocarbon solvent.

A mill base is prepared by grinding together the following materials:

| | Parts |
|---|---|
| Alkyd resin solution | 133 |
| Titanium oxide | 663 |
| Xylene | 79 |
| Butanol | 9 |
| High flash naphtha | 116 |

An enamel is then prepared by mixing this mill base with additional materials in the following proportions:

| | Parts |
|---|---|
| Mill base | 604 |
| Alkyd resin solution | 262 |
| Butyl acid polysilicate solution | 170 |
| Xylene | 482 |
| Butanol | 18 |
| High flash naphtha | 89 |

The alkyd resin used in both the mill base and the enamel is a hydrogenated coconut oil (35%) modified glyceryl phthalate resin prepared in the presence of 2.0% glycerol (based on total resin ingredients) in excess of the theoretical amount required to react with the phthalic anhydride present. It is used as a 60% solution in a 9:1 mixture of xylene and butanol.

The butyl acid polysilicate solution is prepared as follows from a butanol solution obtained as described in Example VIII. To 300 parts of the butanol solution of butyl acid polysilicate are added 50 parts of toluene and 0.18 part of 96% sulfuric acid. Water is distilled from the solution for two hours at atmospheric pressure as an azeotrope with toluene and butanol; the non-aqueous portion of the distillate is continuously separated from the water and returned into the still. Then the solution is concentrated by distillation of the toluene and part of the butanol at a pressure of 30 mm. of mercury to an $SiO_2$ content of 35%. Sufficient high solvency petroleum hydrocarbon is added to reduce the $SiO_2$ concentration to 20%.

A film of this enamel baked for 1 hour at 104° C. is tack-free, hard, and glossy, whereas a control film containing no polysilicic acid ester remains tacky.

Example X

In this example a semi-drying oil modified alkyd resin is modified with a solution of butyl acid polysilicates in a mixture of butanol and a hydrocarbon solvent.

A solution of butyl acid polysilicate in a mixture of butanol and high solvency petroleum hydrocarbon prepared as described in Example IX is mixed with a xylene solution of a soybean oil (43%) modified glyceryl phthalate resin prepared in the presence of 5% glycerol (based on total resin ingredients) in excess of the theoretical amount required to react with the phthalic anhydride present. Proportions used are such that the resulting composition contains 10% $SiO_2$ based on the alkyd resin weight. A film of this composition baked for 1 hour at 127° C. is tack-free, clear, glossy, and much harder than a control film containing no polysilicic acid ester.

Example XI

In this example an enamel based on a semi-drying oil modified alkyd resin is modified with a butanol solution of butyl acid polysilicates.

A mill base is prepared by grinding together the following materials:

| | Parts |
|---|---|
| Alkyd resin solution | 320 |
| Titanium oxide | 551 |
| Zinc oxide | 34 |
| High solvency petroleum | 95 |

An enamel is then prepared by mixing this mill base with additional materials in the following proportions:

| | Parts |
|---|---|
| Mill base | 674 |
| Alkyd resin solution | 290 |
| Butyl acid polysilicate solution | 150 |
| Xylene | 190 |

The alkyd resin used in both the mill base and the enamel is a soybean oil (50%) modified glyceryl phthalate resin. For use in the mill base, it is dissolved in an equal part of a 1:2 mixture of high solvency petroleum and turpentine substitute. For use in the enamel, 70 parts of alkyd resin is dissolved in 30 parts of a 1:1 mixture of xylene and butanol. The butanol solution of butyl acid polysilicates is prepared as described in Example VIII.

A film of this enamel baked for 1 hour at 100° C. is tack-free, glossy, hard, and tough, whereas a control film containing no polysilicic acid ester remains tacky and soft.

*Example XII*

In this example a drying oil modified alkyd resin is modified with a solution of butyl acid polysilicates in a mixture of butanol and a hydrocarbon solvent.

A solution of butyl acid polysilicates in a mixture of butanol and high solvency petroleum hydrocarbon prepared as described in Example IX is mixed with a xylene-high flash naphtha solution of a dehydrated castor oil (43%) modified glyceryl phthalate resin prepared in the presence of 5.73% glycerol (based on total resin ingredients) in excess of the theoretical amount required to react with the phthalic anhydride present. Proportions used are such that the resulting composition contains 23% $SiO_2$ based on the alkyd resin weight. A film of this composition baked for 1 hour at 127° C. is tack-free, clear, glossy, and extremely hard, much harder than a control film containing no polysilicic acid ester.

*Example XIII*

In this example an enamel based on a drying oil modified alkyd resin is modified with a solution of butyl acid polysilicates in a mixture of butanol and a hydrocarbon solvent.

A mill base is prepared by grinding together the following materials:

| | Parts |
|---|---|
| Alkyd resin solution | 145 |
| Prussian blue | 250 |
| High flash naphtha | 366 |

An enamel is then prepared by mixing this mill base with additional materials in the following proportions:

| | Parts |
|---|---|
| Mill base | 761 |
| Alkyd resin solution | 855 |
| Butyl acid polysilicate solution | 500 |
| High flash naphtha | 855 |

The alkyd resin used in both the mill base and the enamel is the same as that described in Example XII. It is used as a 50% solution in high flash naphtha. The solution of butyl acid polysilicates is prepared as described in Example IX.

A film of this enamel baked for 1 hour at 104° C. is tack-free, glossy, flexible, and much harder than a control film containing no polysilicic acid ester.

*Example XIV*

In this example a drying oil modified alkyd resin is modified with a solution of butyl acid polysilicates in a mixture of butanol and a hydrocarbon solvent and used as an air drying finish.

A solution of butyl acid polysilicates in a mixture of butanol and high solvency petroleum is prepared as described in Example IX except that phosphoric acid is used in place of sulfuric acid. It is mixed with a solution of cobalt naphthenate drier and a hydrocarbon solution of a linseed oil (52%) modified glyceryl phthalate resin prepared in the presence of approximately 2% glycerol (based on total resin ingredients) in excess of the theoretical amount required to react with the phthalic anhydride present. Proportions used are such that the resulting composition contains 0.1% cobalt based on the oil in the resin and 30% $SiO_2$ based on the alkyd resin weight.

A film of this composition is dried at room temperature. It becomes dust-free in 10 minutes and tack-free in 2 hours, whereas a control film containing no polysilicic acid ester becomes dust-free only after 25 minutes and tack-free only after 3 hours. The modified film becomes much harder than the control film when they are dried over night.

*Example XV*

In this example a short, non-drying oil modified alkyd resin containing excess glycerol is modified with an ethanol solution of ethyl acid polysilicates prepared by partial hydrolysis of ethyl silicate.

An ethanol solution containing 12.9% $SiO_2$ as ethyl acid polysilicates is prepared by mixing 104 parts of tetraethyl silicate with 6 parts of water and 3 parts of 0.01 N hydrochloric acid in 117 parts of absolute ethanol. The solution is cooled at once to 5° C. and allowed to stand at that temperature for 24 hours before use.

The ethanol solution of ethyl acid polysilicates prepared in this manner is mixed with a xylene solution of a castor oil (43%) modified glyceryl phthalate resin prepared in the presence of 5.8% glycerol (based on total resin ingredients) in excess of the theoretical amount required to react with the phthalic anhydride present. Proportions used are such that the resulting composition contains 20% $SiO_2$ based on the alkyd resin weight. A film of this composition baked for 1 hour at 125° C. is tack-free, clear, glossy, and hard, whereas a control film from a composition containing an equivalent amount of tetraethyl silicate remains tacky and soft. A control containing no silicic acid ester also remains tacky and soft.

*Example XVI*

In this example a long, non-drying oil modified alkyd resin is modified with an ethanol solution of ethyl acid polysilicates prepared by partial hydrolysis of ethyl silicate.

An ethanol solution containing 13% $SiO_2$ as ethyl acid polysilicates is prepared by mixing 104 parts of tetraethyl silicate with 17.7 parts of water and 0.3 part of 0.1 N hydrochloric acid in 108 parts of absolute ethanol. The solution is cooled and allowed to stand at 4 to 5° C. for 24 hours before use.

The ethanol solution of ethyl acid polysilicates prepared in this manner is mixed with a solution of a castor oil (55%) modified glyceryl phthalate resin prepared in the presence of an excess of glycerol over the theoretical amount required to react with the phthalic anhydride present. The alkyd resin solvent is a mixture of isobutanol and a hydrocarbon. Proportions of solutions used are such that the resulting composition contains 20% $SiO_2$ based on the alkyd resin weight. A film of this composition baked for 1 hour at 125 to 130° C. is tack-free, glossy, and hard, whereas a control film containing no polysilicic acid ester remains tacky and soft.

Example XVII

In this example a semi-drying oil modified alkyd resin is modified with an ethanol solution of ethyl acid polysilicates prepared by partial hydrolysis of tetraethyl silicate.

An ethanol solution of ethyl acid polysilicates prepared as described in Example XV is mixed with a solution of a soybean oil (50%) modified glyceryl phthalate resin in a mixture of high solvency petroleum and turpentine substitute. Proportions used are such that the resulting composition contains 20% $SiO_2$ based on the alkyd resin weight. A film of this composition baked for 45 minutes at 125° C. is tack-free, clear, glossy, and hard, whereas a control film from a composition containing an equivalent amount of tetraethyl silicate remains tacky and soft. A control film containing no silicic acid ester also remains tacky and soft.

Example XVIII

In this example a drying oil modified alkyd resin is modified with an ethanol solution of ethyl polysilicates prepared by partial hydrolysis of tetraethyl silicate.

An ethanol solution of ethyl acid polysilicates prepared as described in Example XV is mixed with a solution of linseed oil (34.7%)-China-wood oil (13.9%) modified glyceryl phthalate resin prepared in the presence of 2.25% glycerol (based on total resin ingredients) in excess of the theoretical amount required to react with the phthalic anhydride present. The alkyd resin solvent is a mixture of butanol and a hydrocarbon. Proportions of solutions used are such that the resulting composition contains 20% $SiO_2$ based on the alkyd resin weight. A film of the composition baked for 1 hour at 125 to 130° C. is tack-free, clear, glossy, and hard, whereas a control film from a composition containing an equivalent amount of tetraethyl silicate remains tacky and soft. A control film containing no silicic acid ester also remains tacky and soft.

The beneficial effects of the herein described modification of alkyd resins with polysilicic acid esters are obtained to a greater or less extent with any kind of organic solvent-soluble alkyd resin whatever, regardless of the nature and number of polycarboxylic acids, polyhydric alcohols, and hydroxycarboxylic acids used to make it, and regardless of the presence or absence of monofunctional modifiers, and, if present, their nature. The term "alkyd resin" is intended to include any synthetic polymer obtainable by an esterification reaction between compounds which contain more than one functional group capable of participating in an esterification reaction. Thus, it is intended to include polyesters manufactured from such polycarboxylic acids as oxalic, succinic, glutaric, adipic, pimelic, sebacic, hexadecamethylene dicarboxylic, 2-phenyl glutaric, maleic, phthalic, isophthalic, terephthalic, acetylene dicarboxylic, itaconic, malic, citric, camphoric, and diphenic acids or anhydrides thereof; and from such polyhydric alcohols as ethylene glycol, propylene glycol, hexamethylene glycol, decamethylene glycol, diethylene glycol, pinacol, glycerol, 1,1,1-trimethylol propane, erythritol, pentaerythritol and mannitol; or from hydroxycarboxylic acids as hydroxyacetic acid, lactic acid, omega-hydroxydecanoic acid, omega-hydroxycaproic acid, etc. In many cases monomeric esters of these acids derived from alcohols which boil at temperatures below about 150° C. are also suitable for use in the manufacture of alkyd resins. These resins can optionally be modified with such monocarboxylic acids as butyric acid, lauric acid, stearic acid, acrylic acid, oleic acid, ricinoleic acid, chloroacetic acid, benzoic acid, salicylic acid, abietic acid (rosin), cottonseed oil acids, linseed oil acids, soybean oil acids, and China-wood oil acids; and/or with such monohydric alcohols as methyl, butyl, allyl, benzyl, n-dodecyl, linoleyl, and cyclohexyl alcohols; and/or with any other known type of alkyd resin modifying agents, e. g., primary and secondary mono- and polyamines, including amino acids and amino alcohols. Suitable resins can be made from any mixture of these ingredients provided, of course, that the mixture always comprises in polymerizing proportions at least one hydroxycarboxylic acid or at least one polycarboxylic acid and at least one polyhydric alcohol. These ingredients can be combined by any of the methods known in the art but to be most useful in preparing coating composition vehicles, the resin should not have been carried in its preparation to the point where it is no longer soluble in some organic solvent. For example, suitable alkyd resins can be prepared by any of the following methods: (1) fusion of a mixture of a polyhydric alcohol and polycarboxylic acid, (2) fusion of a suitable hydroxycarboxylic acid, (3) fusion of a polyhydric alcohol, polycarboxylic acid and fatty oil acid, (4) fusion of a fatty oil (a triglyceride) with glycerol to form the mono- or diglyceride, followed by fusion with a polycarboxylic acid, or (5) the solution method described in U. S. 2,057,765.

In addition to the polysilicic acid esters prepared as described in the examples, polysilicic acid esters prepared by any other processes are suitable for use in this invention. These include polysilicic acid esters prepared (1) by partial hydrolysis of silicic acid esters which contain no unesterified silicic acid hydroxyl groups, (2) by reaction of silicon tetrachloride with an alcohol which contains a suitable amount of water, and (3) by contacting dissolved polysilicic acids with an esterifying agent such as a monohydric alcohol and removing water from the resulting solution. Method (3) and the esterified polysilicic acids obtained thereby are described in the above referred to application of Joseph S. Kirk and in U. S. patent application Ser. No. 439,548, filed April 18, 1942, by Ralph K. Iler and Joseph S. Kirk. The esterified polysilicic acids prepared by method (3) are preferred for use in this invention.

The alcohol from which the polysilicic acid ester is derived should preferably, although not necessarily, boil at a temperature below 200° C., or better still, below 150° C. The solubility of polysilicic acid esters in hydrocarbon solvents and their compatibility with resins in which the ratio of carbon to oxygen is high, as in long oil alkyds, increase with increase in the degree of esterification of the polysilicic acid (i. e., with increase in the ratio of silicic acid ester groups to silicon atoms) and with increase in the number of carbon atoms in each silicic acid ester group. Therefore, while a butanol solution of a butyl polysilicate containing an average of one butyl ester group for each five silicon atoms is satisfactory for use in modifying a short oil castor oil modified alkyd, a hydrocarbon solution of a butyl polysilicate containing an average of one butyl ester group for each silicon atom or of an octyl polysilicate containing an average of one octyl ester group for each three silicon atoms is preferred for use in modifying a long oil cottonseed oil-modified alkyd.

In general polysilicic acid esters containing some unesterified silicic acid hydroxyl groups are preferred over completely esterified polysilicic acid esters. For convenience, these compounds are referred to as "acid polysilicic acid esters." The beneficial effect of the ester on the drying rate, particularly at low temperatures, and on the hardness of alkyd resins is much more pronounced when the ester contains free silicic acid hydroxyl groups than when the neutral esters containing no free silicic acid hydroxyl groups is used.

Acid polysilicic acid esters suitable for use in this invention may vary in molecular weight from esters containing only two silicon atoms per molecule to those whose molecules are of colloidal dimensions and whose sols are approaching the gel state. It is generally preferred that the molecular weight of the polysilicic acid ester be relatively low. The higher molecular weight polysilicic acid esters are less compatible with hydrocarbon solvents and with alkyd resins than are polysilicic acid esters of lower molecular weight.

The amount of polysilicic acid ester which can be used ranges from mere traces up to very large amounts. In general, for a given resin, the effect on hardening rate and general resin properties will be proportional to the quantity of polysilicic acid ester.

Particularly useful compositions from the standpoint of flexibility, hardness, and drying rate are those containing 5–35% by weight of $SiO_2$ (in the form of a polysilicic acid ester) based on the weight of the alkyd resin. For most purposes, compositions containing less than about 5% of $SiO_2$ do not tend to show significant difference over the unmodified alkyds while compositions containing more than 35% tend to lack flexibility.

In the preparation of alkyd resin solutions containing polysilicic acid esters, it is preferable that the ingredients of the solution not contain an excessive amount of water since extensive hydrolysis of polysilicic acid esters results in gel formation. However, if the solution is applied soon after mixing it may contain considerable amounts of water. No special precautions need as a rule be taken since common alkyd resin solutions are usually sufficiently anhydrous. The solvent used may be any solvent which dissolves the alkyd resin and the polysilicic acid ester and is chemically inert to the polysilicic acid ester under the conditions of treatment. Suitable solvents include xylene, benzene, toluene, high-boiling aliphatic, aromatic or naphthenic hydrocarbons, dioxane, and alcohols such as the butanols. Use of solvents which contain free amine groups should ordinarily be avoided since they usually cause rapid gelation of polysilicic acid esters.

It is usually satisfactory merely to add the modifier solution to the resin solution and agitate at room temperature until solution is effected, after which the solution is ready for application as a coating composition by any conventional method, such as flowing, brushing, dipping, spraying, or by using a doctor knife or applicator roll.

The beneficial effect of the polysilicic acid ester will in general be realized to some extent when the film is air-dried at ordinary temperatures, but the extent of the improvement will vary considerably with the type of resin and the polysilicic acid ester. For example, the beneficial effect of the polysilicic acid ester on the rate of drying at ordinary temperatures usually increases with a decrease in the degree of esterification of the polysilicic acid ester. Application of the polysilicic acid ester-modified alkyd resin coating composition to the object or surface to be coated, followed by drying of the film at room temperature is a part of the invention. However, it will generally be found that the maximum effect of the polysilicic acid ester is obtained or developed by subjecting the film, after application, to a baking treatment, e. g., at 80–200° C. for 15 minutes to several hours, the time, of course, varying inversely with the temperature. In general, temperatures of 100–150° C. are preferred. One of the important advantages of the compositions of this invention is their ability to set up rapidly on baking at much lower temperatures than would normally be used.

A further modification of this invention is the preparation of untreated alkyd resin films which, after a brief hardening, are then treated with a polysilicic acid ester. A clear or enamel based on an alkyd resin is brushed or sprayed on the substrate and partially hardened by a brief air-drying or baking. The modifier in a solvent which will penetrate the film is next applied to the surface of the film, which is then air-dried or baked to the desired state of hardness. Films treated in this way are also characterized by improved surface hardness, resistance to water, and durability on outdoor exposure. This is one variation of the invention in which the resin at the time of treatment, is usually no longer soluble.

Small proportions of soluble metallic driers, such as cobalt, manganese, and lead naphthenates and linoleates, while not an essential constituent of the modified coating compositions of the invention, in many cases enhance the effect of the polysilicic acid ester in accelerating the drying and hardening of alkyd resin films. Suitable amounts of metallic drier are 0.01–1.0% of the metal, based on the weight of the resin, or, if the resin contains about 35% or more of a drying oil, on its oil content.

The products of this invention are useful as vehicles for improved air-drying or baking coating, impregnating, or adhesive compositions. For these uses, they can be formulated with pigments, metallic driers, dyes, fillers, waxes, inhibitors, plasticizers, and thinners by any of the methods known in the art.

Useful coating compositions can also be made from these modified alkyd resin solutions by addition of other film-forming materials such as drying oils, drying oil varnishes, natural resins, cellulose acetate, cellulose nitrate, chlorinated rubber and soluble phenol-formaldehyde or urea-formaldehyde resins. With or without the above noted auxiliary film-forming and other materials the products can be used to coat metal or wood directly or over a suitable base coat. They can also be used over glass, leather, stone, cloth, paper, rubber, or films of other film-forming organic materials. The form of the substrate is immaterial. The products of this invention can also be prepared in the shape of unsupported films or sheets. The latter can be employed for a variety of purposes, such as for safety glass interlayers, wrapping foil and the like.

A preferred embodiment of this invention involves the modification of alkyd resins obtainable by an esterification reaction involving at least one compound having more than two functional groups capable of participating in an esterification reaction. Resins of this type are more readily available, more widely used, and more suitable for use in coating compositions than are linear condensation polyesters, which are obtained from bifunctional compounds.

A preferred more specific embodiment of this invention involves the modification of alkyd resins which contain from about 35 to 65% fatty oils, (e. g. China-wood oil, castor oil, cottonseed oil, linseed oil, and soybean oil) and 65 to 35% polyhydric alcohol-polycarboxylic acid ester, especially glyceryl phthalate. It is frequently advantageous to incorporate in the resin a low proportion (e. g. 1–5%, based on the total resin ingredients) of excess polyhydric alcohol, especially glycerol. When this is done, the modification with the polysilicic acid ester results in a product which dries faster at elevated temperatures than that obtained by treating a balanced formula resin with the polysilicic acid ester.

Another embodiment of this invention involves modification of alkyd resins with organic solvent soluble polysilicic acid esters prepared by esterification of polysilicic acids.

A further embodiment involves use of organic solvent-soluble polysilicic acid esters in which the ratio of carbon atoms to silicon atoms is greater than 1:1. Such esters are more compatible with alkyd resins than are esters in which the ratio of carbon atoms to silicon atoms is lower.

Another more preferred embodiment involves use of organic solvent soluble polysilicic acid esters in which the ratio of the silicic acid ester groups to silicon atoms is greater than 1:10. Such esters are more stable toward polymerization (and hence more stable when stored) than are esters in which the ratio of ester groups to silicon atoms is lower.

The invention also contemplates the use of polysilicic acid esters which are soluble in hydrocarbon solvents. Esters of this type are more compatible with and more convenient for use with oil-modified alkyd resins, which are usually applied from hydrocarbon solvents, than are polysilicic acid esters which are substantially insoluble in hydrocarbon solvents.

An organic solvent-soluble n-butyl polysilicate may be used in which the ratio of silicic acid ester groups to silicon atoms is greater than 1:4.

It is apparent that many widely different embodiments of this invention may be made without departing from the spirit and scope thereof, and therefore, it is not intended to be limited except as indicated in the appended claims.

We claim:

1. A composition comprising a fatty oil modified alkyd resin and an ester of a polysilicic acid and a lower monohydric saturated aliphatic alcohol having a boiling point below 200° C., in amount corresponding to 5 to 35% of $SiO_2$ based on the weight of the alkyd resin dispersed in a common solvent for the alkyd resin and the ester, said polysilicic acid ester containing unesterified silicic acid hydroxyl groups.

2. The composition of claim 1 in which the alkyd resin is modified with hydrogenated coconut oil.

3. A composition comprising a fatty oil modified alkyd resin and a polysilicic acid ester of a lower monohydric saturated aliphatic alcohol having a boiling point below 200° C. in amount corresponding to 5 to 35% of $SiO_2$ based on the weight of the alkyd resin, said ester containing unesterified silicic acid hydroxyl groups, dispersed in a common solvent, the ratio of the ester groups to silicon atoms present in the esterified polysilicic acid being from about 1:20 to 2:1.

4. A coating composition comprising a fatty oil modified alkyd resin, a pigment, a polysilicic acid ester, and a common solvent for the said resin and ester, the said ester being one of a polysilicic acid and a lower monohydric saturated aliphatic alcohol having a boiling point below 200° C. in amount corresponding to 5 to 35% of $SiO_2$ based on the weight of the alkyd resin, said polysilicic acid ester containing unesterified silicic acid hydroxyl groups.

5. The process which comprises blending in a common solvent a fatty oil modified alkyd resin and an ester of a polysilicic acid and a lower monohydric saturated aliphatic alcohol having a boiling point below 200° C. in amount corresponding to 5 to 35% of $SiO_2$ based on the weight of the alkyd resin, said polysilicic acid ester containing unesterified silicic acid hydroxyl groups.

6. The composition of claim 1 in which the ratio of carbon atoms to silicon atoms in the polysilicic acid ester is greater than 1:1.

7. The composition of claim 1 in which the polysilicic acid ester is a n-butyl polysilicate having a ratio of silicic acid ester groups to silicon atoms greater than 1:4.

8. The composition of claim 1 in which the alkyd resin is modified with castor oil.

9. The composition of claim 1 in which the alkyd resin is modified with linseed oil.

RALPH K. ILER.
GEORGE H. LATHAM.
JOHN W. ROBINSON.